United States Patent [19]
Sone et al.

[11] 3,820,884
[45] June 28, 1974

[54] SEARCH READER
[75] Inventors: Yoshiaki Sone; Takamasa Sawada, both of Tokyo, Japan
[73] Assignee: Canon Kabushiki Kaisha, Tokyo, Japan
[22] Filed: Nov. 15, 1972
[21] Appl. No.: 306,840

[30] Foreign Application Priority Data
Nov. 16, 1971 Japan.............................. 46-92160

[52] U.S. Cl..................... 353/26, 226/27, 250/548, 250/570
[51] Int. Cl. ..................... G03b 23/12, B65h 23/04
[58] Field of Search ........... 353/25, 26; 352/13, 92, 352/162; 250/219 DR, 219 FR, 219 D, 548, 570; 226/27

[56] References Cited
UNITED STATES PATENTS
3,290,987 1/1964 James et al. .......................... 353/26
3,525,872 8/1970 Schneider..................... 250/219 DR Primary Examiner—Louis R. Prince
Assistant Examiner—Steven L. Stephan
Attorney, Agent, or Firm—Fitzpatrick, Cella, Harper & Scinto

[57] ABSTRACT

A search reader in which a desired image frame in a rolled microfilm may be automatically selected and stopped at a predetermined position and projected on a viewing screen. The reader includes a light-receiving element opposed to an illuminating light source with the microfilm interposed therebetween for receiving light from an index mark on the film and producing a detection signal. The light-receiving element is carried on a movable member. Means is provided to displace the index-mark detecting position of the light-receiving element in accordance with the position of the index mark recorded on the film.

2 Claims, 7 Drawing Figures

3,820,884

SEARCH READER

BACKGROUND OF THE INVENTION

1. Field of the Invention

This invention relates to a search reader, and more particularly to a reader of the type which automatically selects a desired data frame in a rolled microfilm, stops such data frame at a predetermined position and projects or reprints the image contained in such data frame.

2. Description of the Prior Art

In the conventional reader of the described type, the index marks recorded on a microfilm and corresponding to the image frames in such film have been optically read out and then counted by a counter circuit. A desired one of the image frames is identified by one of consecutive numbers, whereafter the difference between the number representing the desired frame and a number stored in the counter circuit is detected and then the microfilm is moved either in take-up direction or in rewind direction until the difference is zero, whereupon the film is stopped and the desired frame in the film is projected on a viewing screen or reprinted on another recording medium.

In this case, the film must be stopped so as to ensure the desired frame therein to be properly projected on the viewing screen. If the index marks corresponding to a series of image frames in the film were recorded at regular or predetermined positions on the film, the film could be stopped in a position where the desired image frame could be properly projected on the viewing screen.

The index marks are usually recorded on a microfilm along a marginal edge thereof as indicated at letter M in FIG. 3 of the accompanying drawings, so as to correspond to a series of image frames in the film, the density of each index mark being different from that of the surrounding portion of the film. However, the positions at which these index marks are recorded on the film are not standardized and so variable from film to film.

Therefore, in a reader of the type which counts the number of image frames by means of such index marks and determines the stop position for a desired image frame in the microfilm, the stop position of the desired image frame is actually variable in accordance with the recorded position of the corresponding index mark. This might cause part or whole of the framed image to protrude out of the confinement of the viewing screen when projected thereon, thus preventing the film from being properly read out or reprinted.

SUMMARY OF THE INVENTION

It is therefore an object of the present invention to eliminate the above-described disadvantages of the prior art.

It is another object of the present invention to provide a search reader which enables image frames in a microfilm to be properly projected on a viewing screen.

It is still another object of the present invention to provide a search reader which enables the photographic image in each frame of the film to be properly read out on the viewing screen.

It is yet another object of the present invention to provide a search reader in which the position for detecting the index marks may be displaced in accordance with the recorded positions of such marks.

BRIEF DESCRIPTION OF THE DRAWINGS

The present invention will be described in further detail with respect to a specific embodiment thereof as shown in the accompanying drawings, in which.

DESCRIPTION OF THE PREFERRED EMBODIMENTS

Figure 1:
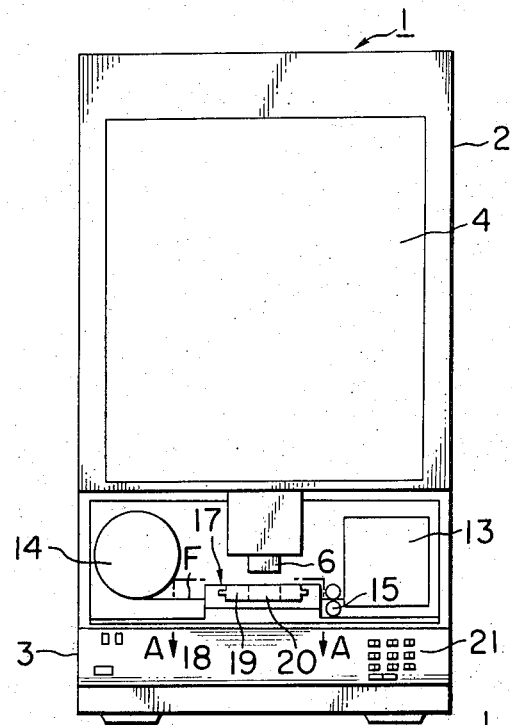
FIG. 1 is a front view of a search reader incorporating the principle of the present invention.
Figure 2:
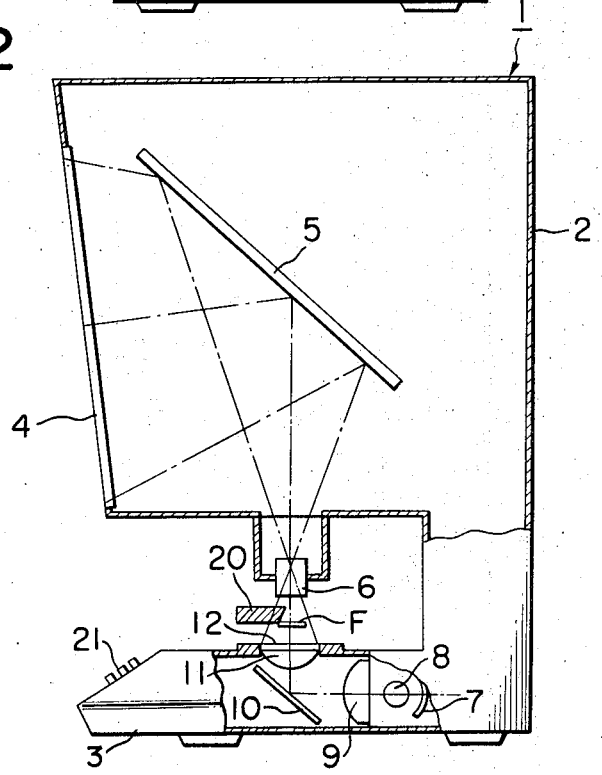
FIG. 2 is a vertical cross-sectional view of the reader.

Referring to FIGS. 1 and 2, the search reader according to the present invention is generally designated by numeral and includes an upper housing 2 and a lower housing 3. A viewing screen 4 is provided on the front face of the upper housing 2. As shown in FIG. 2, a mirror 5 is obliquely disposed within the upper housing 2, and a photographic lens 6 is fixedly mounted below the mirror 5. Within the lower housing 3, a concave mirror 7, a light source such as lamp 8 for illumination, a condenser lens 9, a mirror 10 and a condenser lens 11 are disposed in the named order from right to left in FIG. 2. An aperture 12 is formed through the portion of the lower housing 3 which is opposed to the photographic lens 6.

Disposed between the upper and lower housing 2 and 3 are a film supply magazine 13 containing therein a roll of microfilm F, and a take-up reel 14. The microfilm F in the magazine 13 may be transported by a set of film transport rolls 15 so as to pass between the photographic lens 6 and the illuminating light source, and may be taken up by the take-up reel 14. The film transport rolls 15 can transport the film F in either of forward and reverse directions.

Means 17 is provided to detect an index mark on the microfilm F, and it comprises a holder member 18 provided on the upper surface of the lower housing 3 of the reader 1, a slidable frame 19 received in a passage formed in the holder member 18, and a movable member 20 held between the opposite side walls of the slidable frame 19.

A keyboard 21 is provided on the front side of the lower housing 3 and may be used to enter a number representing any desired image frame which has been pre-formed with a corresponding index mark.

Figure 3A:
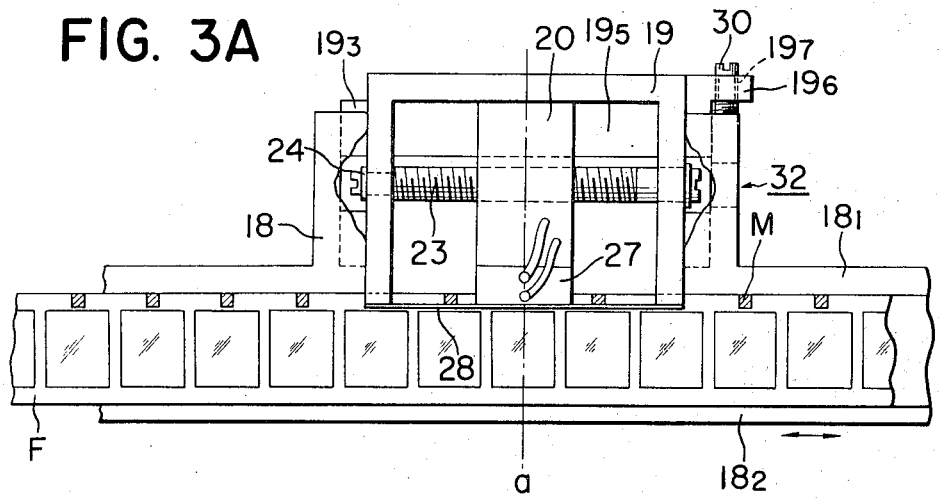
FIG. 3(A) is a detailed view taken along line A—A of FIG. 1.
Figure 3B:
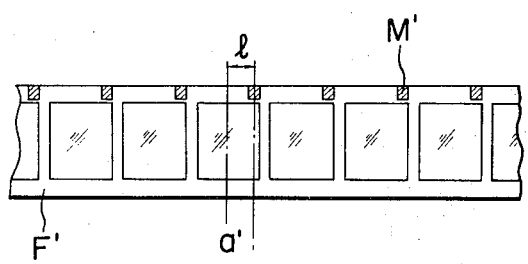
FIG. 3(B) is a front view showing a film with index marks recorded thereon at different positions from those in the film shown in FIG. 3(A)
Figure 5:
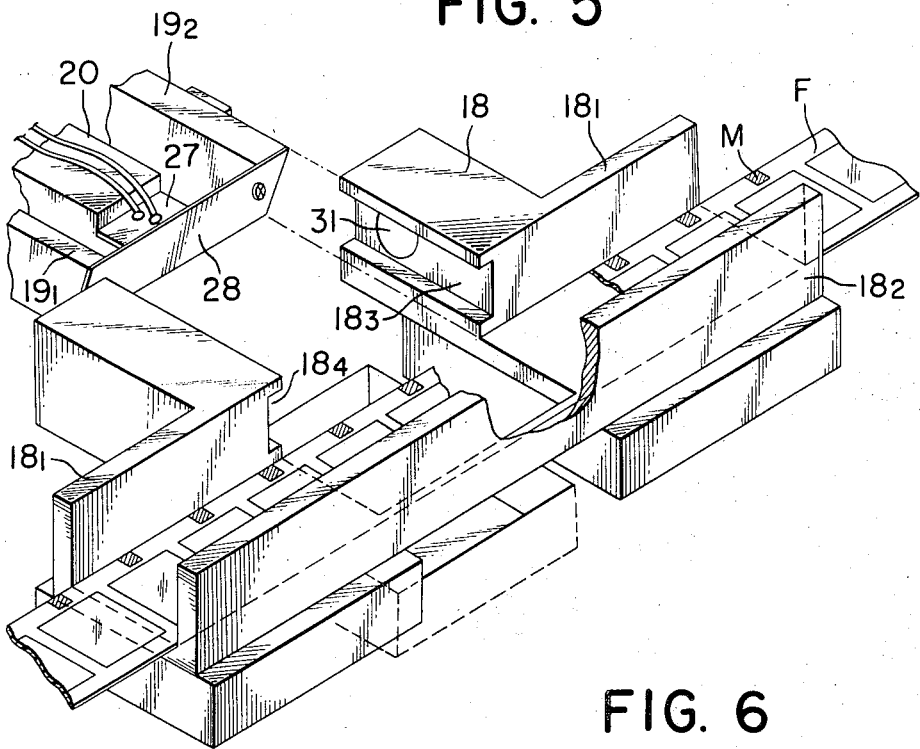
FIG. 5 is a perspective view of a holder member.

The holder frame 18 has a film transport passageway defined by opposed walls $18_1$ and $18_2$ spaced apart by a distance slightly greater than the width of the film F, as shown in FIGS. 3(A) and 5. The holder frame 18 further has passages $18_3$ and $18_4$ formed therein for slidably receiving the slidable frame 19.

The slidable frame 19 includes opposite side walls $19_1$ and $19_2$ having pairs of rectangular portions $19_3$ and $19_4$ projectedly formed thereon, respectively. These rectangular portions $19_3$ and $19_4$ are received in the passages $18_3$ and $18_4$ of the holder member 18 to cause the slidable frame 19 to slide transversely of the film (see FIGS. 4 and 5). The opposite side walls $19_1$ and $19_2$ of the slidable frame 19 are formed with respective through-spertures, inot which a screw rod 23 is inserted at the opposite ends thereof. The opposite free ends of the screw rod 23 are rotatably mounted to the opposite side walls $19_1$ and $19_2$ by means of clampling washers 24.

Figure 4:
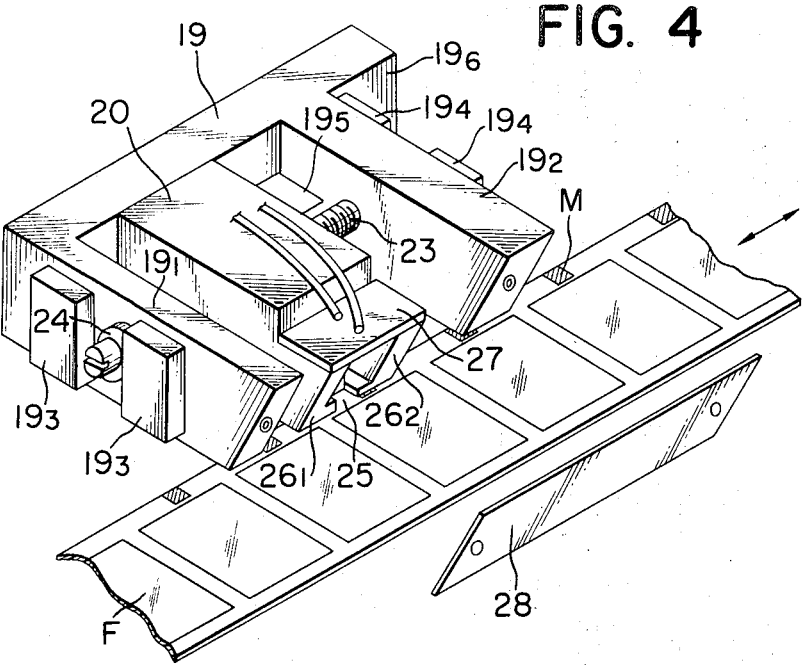
FIG. 4 is a fragmentary perspective view of the same portion as shown in FIG. 3(A)

As shown in FIGS. 3A and 4, the movable member 20 has a threaded bore $20_1$ formed therethrough to threadably pass the screw rod 23. One end portion of the movable member 20 forms a stepped portion adapted for engagement with a stepped portion $19_5$ formed in the slidable frame 19. By inserting a screw driver through an opening formed through the holder member 18 into a tool-receiving groove formed in the head of the screw rod 23 and then rotating the screw driver to rotate the screw rod 23, the movable member 20 may be moved between the opposite side walls $19_1$ and $19_2$ of the slidable frame 19 while maintained in horizontal position with its stepped portion engaged with the stepped portion $19_5$ of the frame 19. Thus, the movable member 20 may be displaced lengthwise of the film, i.e., along the line passing through the index marks recorded on the film.

On that end of the movable member 20 which corresponds to the film F, a slit opening 25 is defined by a pair of projections $26_1$ and $26_2$ (FIG. 4), and a light-receiving element 27 is attached to these projections $26_1$ and $26_2$ in opposed relationship with the slit opening 25. A light-intercepting plate 28 may be secured to the ends of the opposite side walls $19_1$ and $19_2$ of the slidable frame 19 which correspond to the film F. The light-intercepting plate 28 serves to prevent light from entering the light-receiving element 27 through any other portion than the slit opening 25 formed in the movable member 20. By rotating the screw rod 23, the movable member 20 may be moved along the index marks by a distance equal to or greater than the axial length of one image frame of the film. With this, the slit opening 25 of the movable member 20 may be moved along the film transport passageway to shift the position of the light-receiving element 27 for detecting an index mark M.

The slidable frame 19 is also formed with an L-shaped projection $19_6$, which in turn is formed with a threaded hole $19_7$ for receiving a screw rod 30.

When the slidable frame 19 is received in the passages $18_3$ and $18_4$ formed in the holder member 18, it is stopped at a position where the end of the screw rod 30 is engaged with the holder member 18. By adjusting the amount of rotation of the screw rod 30, the stop position of the slidable frame 19 may be adjusted to thereby control the position of the frame 19 with respect to the transverse direction of the film.

Here it is assumed that a light-intercepting index mark M is recorded for each frame of the microfilm F at a point thereon lying on the center line $a$ of the frame, as shown in FIG. 3(A).

By adjusting the screw rod 30 screwed into the projection $19_7$ of the slidable frame 19, the stop position of the slidable frame 19 is set so that the light-receiving element 27 of the movable member 20 is positioned to confront the index mark M on the film F during the transportation therof.

Subsequently, the screw rod 23 mounted to the movable member 20 is rotated to move the movable member 20 to thereby determine the position for the light-receiving element 27 to detect the index mark M. More specifically, the position of the movable member 20 is set so that a desired frame of the film may be properly projected on the screen 4 of the reader 1 when the film is stopped by means of the search device after the index mark corresponding to the desired frame is received by the light-receiving element 27 through the slit opening 25.

Figure 6:
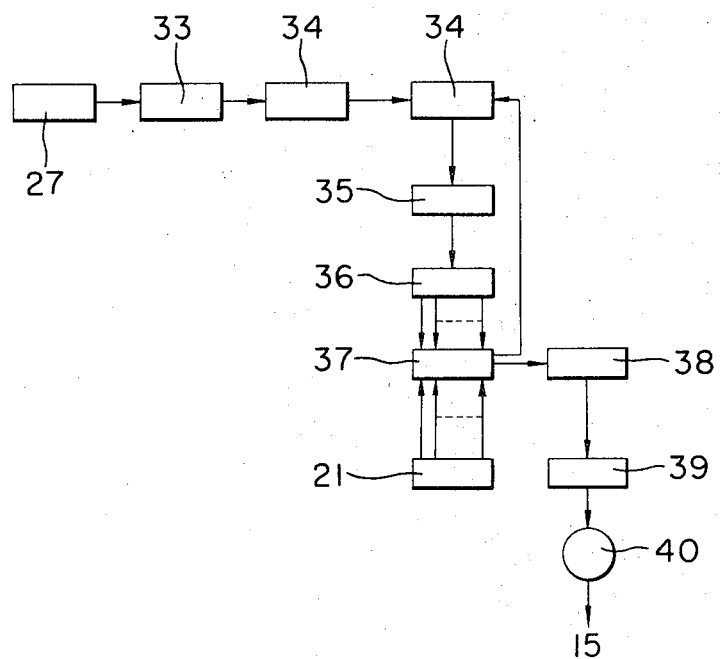
FIG. 6 is a block diagram of the search device of the present invention.

A block diagram of the search device is shown in FIG. 6. The light received by the light-receiving element 27 is photoelectrically converted by a photoelectric converter circuit 33, whose output is passed through an amplifier circuit 34, an addition-subtraction changeover circuit 34' and a trigger circuit 35 to a counter circuit 36. When a number representing a desired image frame to be searched is imparted by means such as key board 21 or aperture or magnetic tape, a subtraction circuit 37 compares such number with the number of the image frame already stored in the counter circuit 36 to detect a difference between the two numbers. If the frame-representing number entered through the keyboard 21 is A and the frame number stored in the counter circuit 36 is B, then the subtraction circuit 37 will provide A−B=C and determine the sign (positive or negative) of C, whereafter a signal corresponding to the sign and numerical value of C will be applied to a digital-analogous converter 38 and back to the addition-subtraction change-over circuit 34'. The output signal of the digital-analogous converter 38 operates a normal-reverse rotation change-over switch 39 to energize a drive motor 40 and transport the film F until the output of the subtraction circuit 37 is zero, whereupon the film F is stopped.

If the result of the comparison carried out by the subtraction circuit 37 is C > 0, for example, the addition-subtraction change-over circuit 34 will be changed over to its addition mode to transport the film F in the normal direction until C = 0, whereupon the film F will be stopped.

When the film F is stopped, the center of the desired image frame as appearing on the screen 4 is in coincidence with the center of the screen 4, since the position of the light-receiving element for receiving the index mark is preset as described previously. Thus, the image frame to be searched may be stopped at a position where it is properly projected on the screen.

When an index mark M' is recorded on a microfilm F' at a position deviated from the center $a'$ of an image frame by a distance 1, the stop position of a desired image frame during the searching operation will be varied from that in the above-described case. Therefore, the desired image frame could not properly be projected on the screen 4 when the film F' is stopped, and thus the image projected on the screen 4 could neither properly be read.

To avoid this, the screw rod 23 mounted to the movable member 20 may be rotated by a screw drive or like tool inserted through the opening 32 formed through the holder member 18, to thereby move the movable member 20 by a distance 1 rightwardly in FIG. 3(A), so as to displace the position of the light-receiving element 27 for detecting the index mark. Thus, the desired image frame may be properly projected on the screen 4 when the film F' is stopped.

In the above-described embodiment, the film has been shown as transported only in the normal direction, whereas the film may also be transported in the opposite direction with the same result as described.

Further, the illustrated embodiment has employed a single photoresponsive element 27, but two such elements may be used to ensure the film to be stopped at a predetermined position with a higher accuracy. Although the present invention has been described with respect to a microfilm reader, it is also applicable to a reader-printer to enable desired filmed images to be properly copied. Furthermore, a knob or like means may be mounted on the head of the screw rod 23 to facilitate the rotation thereof.

Thus, according to the present invention, the position for detecting an index mark on a film may be adjusted in accordance with the recorded position of the index mark on the film, whereby any desired image frame in the film may be automatically selected and stopped at a predetermined position for proper projection even if the recorded position of the index marks differs from film to film.

We claim:

1. A reader for searching for a desired frame with the use of a film having a plurality of image frames and index marks provided in the vicinity of the side of said frames, comprising light source means for illuminating the image frames and index marks of said film, feeding means for transporting said film along a predetermined path through an illuminating position, a screen, optical means for projecting an image of the image frame positioned at said illuminating position toward said screen, a movable member disposed in the vicinity of the path of said film and carrying a light-receiving element for receiving the light illuminating said index marks, a sliding member movably holding said movable member and slidable perpendicular to the direction of movement of said movable member, means for counting the index marks which are detected by said light-receiving element, and drive-stopping means for stopping the feeding of said film when a predetermined number of the index marks has been counted and with an index mark in registration with said light receiving means, whereby an image frame searched is positioned at a predetermined position when said film is stopped.

2. A reader according to claim 1, wherein said light-receiving element held by said movable member is disposed between said light source means and said optical means and is displaced to an extent which is longer than the spacing between frames of said film in the direction of feeding said film.

* * * * *